UNITED STATES PATENT OFFICE.

FRANCIS J. KRAMER, OF NILES, OHIO, ASSIGNOR OF ONE-HALF TO JOHN WHITAKER, OF WARREN, OHIO.

BUILDING-BLOCK.

1,363,045.   Specification of Letters Patent.   Patented Dec. 21, 1920.

No Drawing.   Application filed May 25, 1920.   Serial No. 384,173.

*To all whom it may concern:*

Be it known that I, FRANCIS J. KRAMER, residing at Niles, in the county of Trumbull and State of Ohio, a citizen of the United States, have invented or discovered certain new and useful Improvements in Building-Blocks, of which improvements the following is a specification.

My invention relates to improvements in the composition of material for making sidewalk flags, street curbing, sewer tiles, coping blocks, roofing tiles, building blocks, bricks, and generally all such articles as are commonly made of cement.

The composition consists of the following ingredients and preferably in substantially the proportions given:

| | |
|---|---|
| Furnace slag | 79.8 % |
| Cement | 20 % |
| Permanganate of potassium | .175% |
| Hydrofluoric acid | .025% |

These ingredients are compounded in the following manner: The slag is pulverized and preferably sifted, through a sieve of say 100 mesh, coarser or finer, according to the texture desired in the product. With this pulverized slag cement in powdered form is thoroughly mixed, by hand, or by suitable mechanical means. The relative proportions of slag and cement are such as to afford with a minimum amount of the more costly material (cement) a product of the desired strength. The proportion of approximately four to one, indicated in the above formula, will afford a product adequate for such uses as those particularized above.

To this mixture of slag and cement may be added a pigment if desired; or, as will be manifest in the sequel, coloring matter may be added to the batch when being mixed in immediate preparation for use.

This pulverulent material is worked with the addition of water to a paste or plastic of proper consistency, and at the same time the permanganate of potassium and the hydrofluoric acid being first dissolved and then mingled are introduced into the mass. The relative quantities of these two ingredients, which are relatively expensive, should not ordinarily exceed the figures given.

The value of the permanganate of potassium ingredient is that being present it facilitates the hardening of the mixture and tends to prevent the integration of absorbed moisture; the hydrofluoric acid ingredient being present tends to prevent precipitation of alkaline matter and discoloration of blocks incident to varying weather conditions.

When thoroughly mixed and before setting has progressed appreciably the mass of plastic is applied; it may be introduced into molds or presses, such as those ordinarily employed for molding tiles, building blocks, and other articles of the nature contemplated; it may be delivered by slushing or dumping or tamping, between walls of false work, or it may be spread *in situ*, as when laying a sidewalk; in a word, it may be applied just as similar cementitious material is handled in building.

Ordinarily, the material will be made into building blocks or other ultimate shape and sold in that form. In case the material is to be used for sidewalk making or shaped *in situ* elsewhere, the slag and cement (with the coloring matter, if any be used) and chemicals will be mixed in the factory and shipped in mixed condition, and water will be added when application is to be made.

I claim as my invention:

1. A composition of building material consisting of furnace slag pulverized and compounded with cement, together with permanganate of potassium and hydrofluoric acid, substantially as described.

2. A composition of building material consisting of furnace slag pulverized and compounded with cement and pigment, together with permanganate of potassium and hydrofluoric acid, substantially as described.

3. A building material compounded substantially as follows: furnace slag, 79.8%; cement, 20%; hydrofluoric acid, .025%; permanganate of potassium, .175%.

4. A building block compounded substantially as follows: furnace slag and cement in proportions of four to one made plastic for shaping and setting with water carrying in solution permanganate of potassium and hydrofluoric acid.

In testimony whereof I have hereunto set my hand.

FRANCIS J. KRAMER.

Witnesses:
J. WHITAKER,
JOHN W. HUGHES.